(12) United States Patent
Ono et al.

(10) Patent No.: US 7,098,895 B2
(45) Date of Patent: Aug. 29, 2006

(54) OPTICAL TRACKBALL DEVICE AND ELECTRONIC APPARATUS

(75) Inventors: Takatoshi Ono, Kyoto (JP); Takefumi Inoue, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 376 days.

(21) Appl. No.: 10/464,746

(22) Filed: Jun. 19, 2003

(65) Prior Publication Data

US 2004/0036677 A1   Feb. 26, 2004

(30) Foreign Application Priority Data

Jul. 1, 2002  (JP) .............................. 2002-191883

(51) Int. Cl.
*G09G 5/08* (2006.01)
(52) U.S. Cl. .................... 345/167; 345/161; 345/157; 345/159
(58) Field of Classification Search ................ 345/207, 345/156–173, 112, 145, 175, 857; 356/28; 395/161; 178/18.09; 369/13; 359/267
See application file for complete search history.

(56) References Cited

U.S. PATENT DOCUMENTS

| 5,195,179 | A | * | 3/1993 | Tokunaga | 345/159 |
| 5,444,677 | A | * | 8/1995 | Hosokawa et al. | 369/13.32 |
| 5,691,747 | A | * | 11/1997 | Amano | 345/167 |
| 6,084,574 | A | * | 7/2000 | Bidiville | 345/166 |
| 6,222,525 | B1 | * | 4/2001 | Armstrong | 345/161 |
| 6,421,045 | B1 | * | 7/2002 | Venkat et al. | 345/167 |
| 6,424,407 | B1 | * | 7/2002 | Kinrot et al. | 356/28 |
| 6,441,943 | B1 | * | 8/2002 | Roberts et al. | 359/267 |
| 6,750,846 | B1 | * | 6/2004 | Rotzoll | 345/157 |
| 2002/0149561 | A1 | * | 10/2002 | Fukumoto et al. | 345/156 |
| 2003/0034959 | A1 | * | 2/2003 | Davis et al. | 345/166 |
| 2003/0085876 | A1 | * | 5/2003 | Su | 345/166 |
| 2004/0135825 | A1 | * | 7/2004 | Brosnan | 345/857 |
| 2004/0174340 | A1 | * | 9/2004 | Bruneau et al. | 345/167 |
| 2005/0017947 | A1 | * | 1/2005 | Shahoian et al. | 345/156 |
| 2005/0062720 | A1 | * | 3/2005 | Rotzoll et al. | 345/166 |
| 2006/0022939 | A1 | * | 2/2006 | Armstrong | 345/156 |

* cited by examiner

*Primary Examiner*—Bipin Shalwala
*Assistant Examiner*—Prabodh Dharia
(74) *Attorney, Agent, or Firm*—Wenderoth, Lind & Ponack, L.L.P.

(57) ABSTRACT

An optical trackball device of the present invention includes a ball as an operating member, using a material that partially transmits light, and this ball is rotatably supported by a support member. Light emitted from a light emitter disposed beneath the ball is reflected on this ball. A detector detects the reflected light to identify rotation of the ball. Since the light from the light emitter is partially transmitted through the ball, the ball can be illuminated without providing an additional component. Accordingly, a location of the ball is easily recognizable even in a dark place.

13 Claims, 5 Drawing Sheets

OPTICAL TRACKBALL DEVICE AND ELECTRONIC APPARATUS

BACKGROUND OF THE INVENTION

1. Field of the Invention

The present invention relates to optical trackball devices provided as input devices for a range of electronic apparatuses, and electronic apparatuses using such optical trackball devices.

2. Background Art

Electronic apparatuses are generally designed to activate required functions by operating an input device, and thus electronic apparatuses controlled by input devices with better operability are preferred. A conventional electronic apparatus, using a personal computer as an example, is described below with reference to FIGS. 5 to 7.

Figure 5:
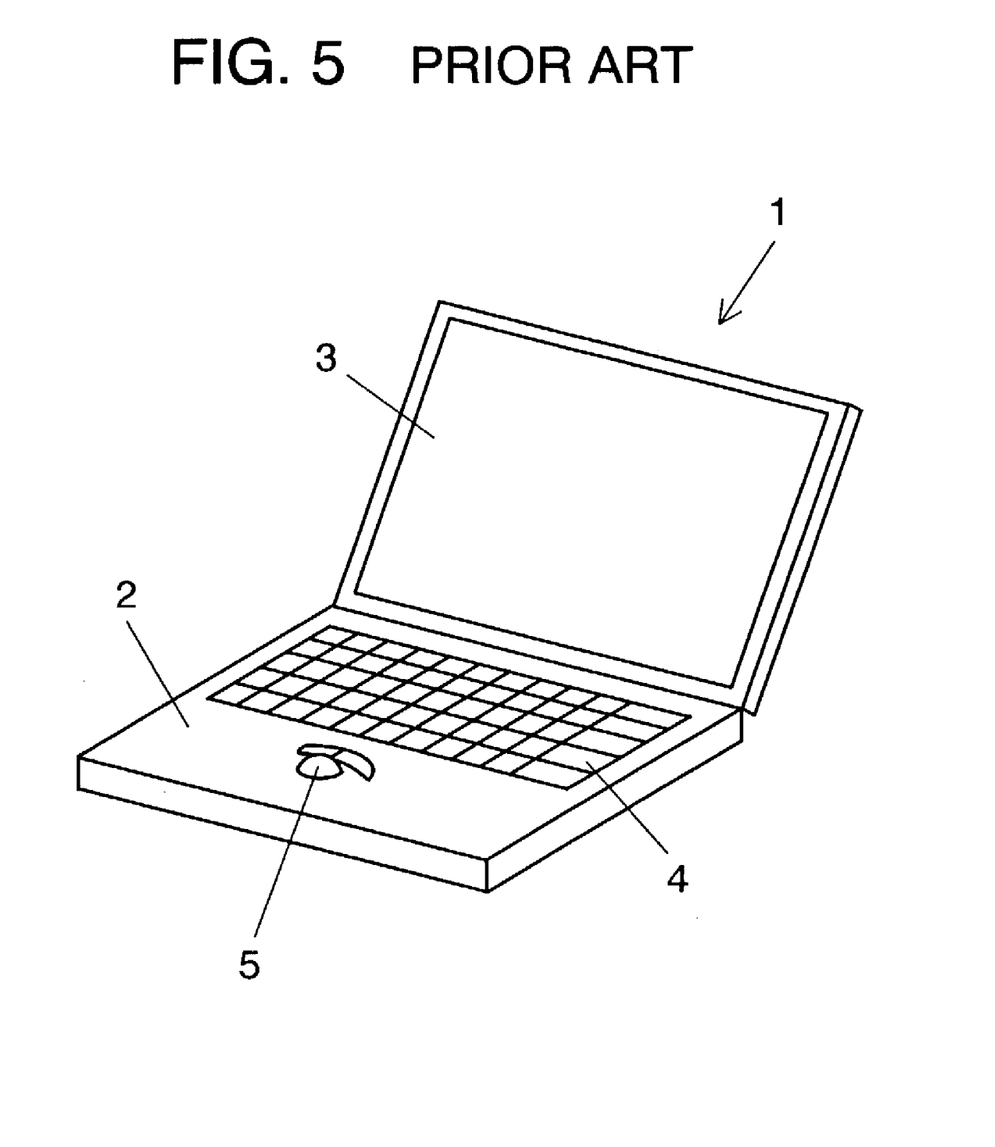
FIG. 5 shows a configuration of a conventional personal computer.
Figure 6:
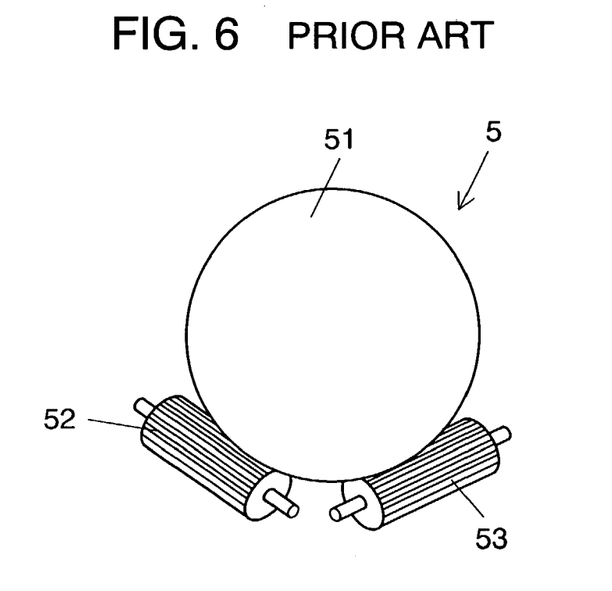
FIG. 6 is a perspective view of a key part of a conventional trackball device.

FIG. 5 is a perspective view of a conventional personal computer. As shown in FIG. 5, personal computer 1 (PC 1) is a so-called laptop PC in which display unit 3 is openably attached to main unit 2. Keyboard 4 is disposed at the upper part of main unit 2, and trackball device 5 is disposed at the lower part of main unit 2. A controller (not illustrated) for controlling display unit 3, keyboard 4, and trackball device 5 is provided inside main unit 2. This PC 1 is configured to activate a required function when the user operates keyboard 4 or trackball device 5 to input required signals and the controller processes the required signals which are input.

Trackball device 5 is generally used for moving a cursor or pointer on display unit 3. The rotating direction and amount are detected when resin ball 51 protruding from main unit 2 is rotated. Ball 51 of this trackball device 5 is supported by two rollers 52 and 53 which are rotatably disposed perpendicularly to each other, as shown in a perspective view in FIG. 6 and in a top view in FIG. 7. Ball 51 is also supported by rotating member 56 (not illustrated in FIG. 6) at a position opposite that supported by rollers 52 and 53.

Figure 7:
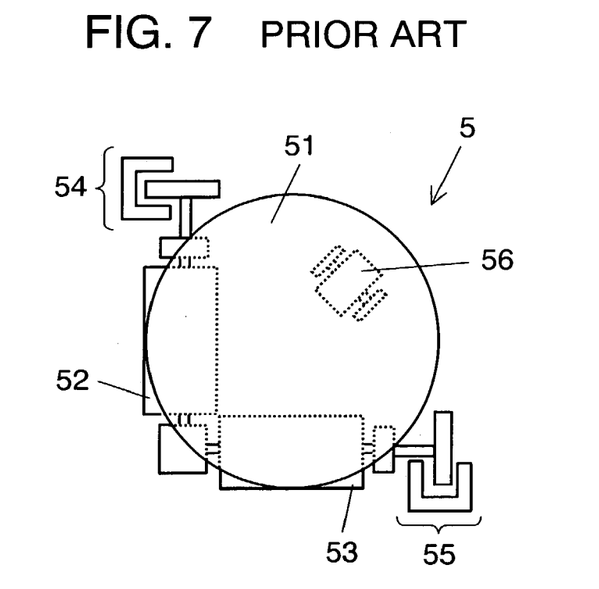
FIG. 7 is a top view of a key part of the conventional trackball device.

Rotating direction and amount are detected using output from encoders 54 and 55 attached to the above two rotatable rollers 52 and 53 respectively, as shown in the top view in FIG. 7. However, the position of ball 51 is difficult to identify in trackball device 5 embedded in conventional PC 1 when PC 1 is used in low ambient light such as at night. To solve this disadvantage, ball 51 can be made of a light-transmitting resin, and an LED can be used to light this ball 51. However, a lighting means such as an LED requires a separate component in addition to encoders 54 and 55 which are rotation-detecting means for ball 51. Consequently, an additional component or assembly step is required.

SUMMARY OF THE INVENTION

The present invention solves the above disadvantage of the prior art, and offers an optical trackball device which can light the aforementioned ball without requiring an exclusive component or increasing the number of components for lighting the ball. The present invention also offers an electronic apparatus using such optical trackball device.

The optical trackball device of the present invention includes:

(a) a ball as an operating member for operating the trackball device;

(b) a support member for rotatably supporting the ball;

(c) a light emitter for emitting light toward the ball;

(d) a detector for detecting the light from the light emitter reflected on the ball; and (e) a controller for controlling the light emitter and detector.

The ball is lighted by transmitting a portion of light emitted from the light emitter.

Still more, the present invention includes an electronic apparatus into which the above optical trackball device is built. This electronic apparatus has a display unit, and the aforementioned control unit also controls functions required for the electronic apparatus, and displays information on the display unit.

DETAILED DESCRIPTION OF THE INVENTION

Exemplary embodiments of the present invention are described below with reference to the drawings.

FIRST EMBODIMENT

Figure 1:
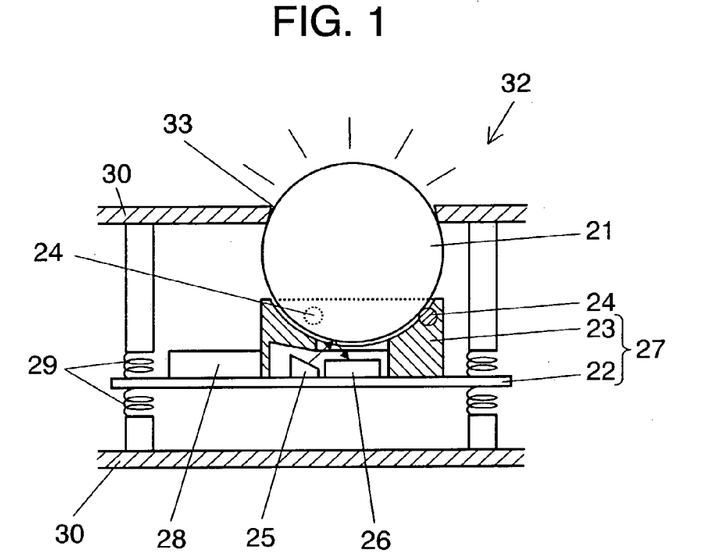
FIG. 1 is a fragmentary section view of an optical trackball device in accordance with a first exemplary embodiment of the present invention.

FIG. 1 is a fragmentary section view of an optical trackball device in a first exemplary embodiment of the present invention. In FIG. 1, ball 21 made of glass or resin is an operating member. A lower part of this ball 21 contacts and is rotatably supported by three supports 24 provided on ball holder 23 fixed to printed circuit board 22. These three supports 24 are spherical in shape, and are rotatably embedded in ball holder 23 at an interval of 120°. Accordingly, ball 21 is rotatably supported by three supports 24. Since supports 24 are provided at the angular interval described above, only two supports 24 are illustrated in FIG. 1, which gives a fragmentary section view.

The entire surface of ball 21 is roughened to 5 µm on average into so-called frosted glass, typically using sandblast, to achieve semi-transmittance of light. The average surface roughness is preferably between 3 µm and 20 µm in order to achieve both stable support by supports 24 and not too rough a feel while operating ball 21.

Ball 21 is generally made of glass. However, although glass has good oil and chemical resistance, it is heavy. The optical trackball device of the present invention can be made of resin to reduce its weight when the optical trackball device is employed in OA apparatuses, typically personal computers and mobile equipment. As for resin materials, polycarbonate, which has good light transmittance, is typically used, with its surface roughened as described above.

Light emitter 25, which emits light toward ball 21, and detector 26 which detects the light from light emitter 25 reflected on ball 21 are disposed on printed circuit board 22 beneath ball 21 supported by supports 24 as described above. This detector 26 detects the light within a predetermined area, and is configured with a two-dimensional photodetector such as a C-MOS image sensor and CCD element.

Printed circuit board 22 and ball holder 23 are assembled to function as support member 27. Vibration generator 28 is disposed on this printed circuit board 22, and vibration generated by vibration generator 28 is transmitted to ball 21 through support member 27. Printed circuit board 22, constituting a part of support member 27, is held by housing 30 with resilient member 29 in between to allow fine vibration. Printed circuit board 22, on which light emitter 25, detector 26, and vibration generator 28 are disposed, is electrically coupled to another main printed circuit board (not illustrated). Controller 31, as shown in a block diagram in FIG. 2, configured typically with a microcomputer disposed on the main circuit board, controls light emitter 25, detector 26, and vibration generator 28.

Figure 2:
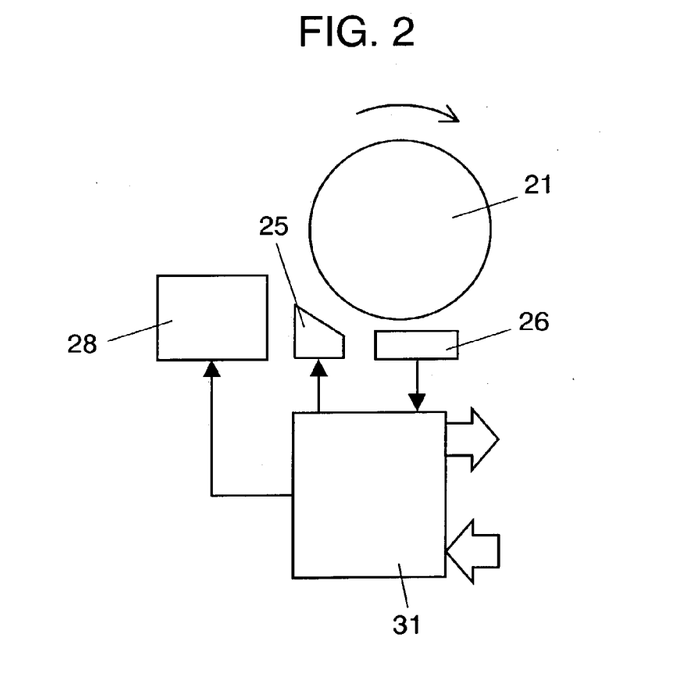
FIG. 2 is a block diagram of the above optical track ball device.

Light emitter 25, which emits light in multiple colors, can be used to allow controller 31 to change the color of light emitted from light emitter 25 as required according to the situation.

Housing 30 has circular hole 33 with a diameter smaller than that of ball 21 on its top part. The upper part of ball 21 protruding from this circular hole 33 is the area operated by the fingers.

Next, the operation of optical trackball device 32 mounted as described above is described with reference to FIGS. 1 and 2.

When the user does not operate a part of ball 21 protruding from housing 30, light emitter 25 lights only faintly, and detector 26 continues to detect the light from ball 21 reflecting this dim light. Since ball 21 is not rotated at this point, there is no change in the level of reflected light. Accordingly, detector 26 periodically outputs the same signal. Controller 31 compares signals received at predetermined intervals, and determines, when there is no difference in signals, that ball 21 is not being moved. In this judgment state, controller 31 instructs light emitter 25 to maintain aforementioned dim light. Even in this non-operational state, the dim light from light emitter 25 partially passes through ball 21, and the transmitted light diffusively reflects at boundaries because the surface of ball 21 is roughened to a predetermined degree. A diffused reflection thus uniformly lights the entire ball 21, facilitating visual recognition of the position of ball 21 even in the dark.

Next, when the user applies force to the protruding part of ball 21 to rotate ball 21, the light reflected on ball 21 changes. Detector 26 recognizes changes at predetermined intervals, and transmits changes to controller 31 every time. Since the surface of ball 21 is not completely uniformly roughened, changes in the reflected light are conspicuously apparent, enabling detector 26 to more accurately detect the rotation of ball 21. If controller 31 recognizes any change in the reflected light from ball 21, controller 31 controls light emitter 25 to strengthen light emission. This increases the level of light transmitted to the upper part of ball 21, making the entire ball 21 more brightly illuminated. At the same time, the light reflected from ball 21 also increases, proportionally increasing the detection accuracy of detector 26. In the above operation, maintaining the low light level from light emitter to ball 21 during the non-operational state reduces power consumption. Controller 31 controls the level of light emitted from light emitter 25 and also determines the rotating direction and speed of ball 21 based on detection signals periodically sent from detector 26.

Figure 3A:
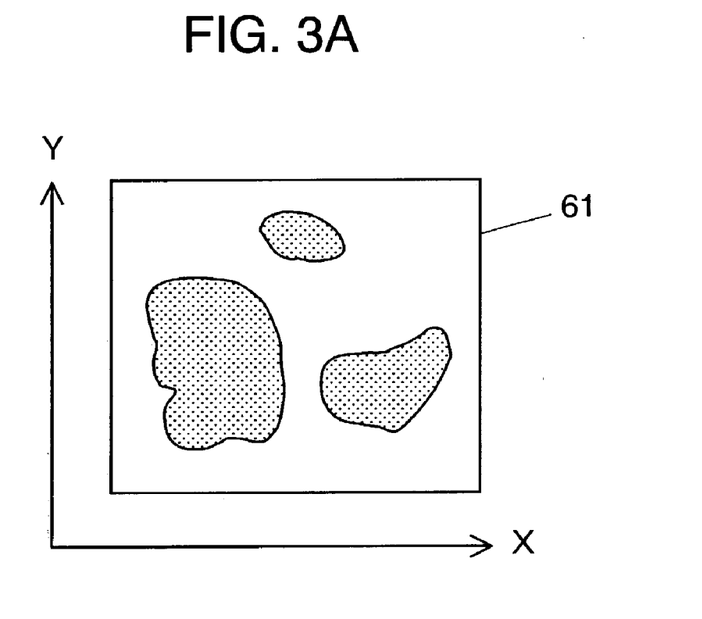
FIGS. 3A and 3B are schematic diagrams illustrating a detection signal of a detector of the optical trackball device.
Figure 3B:
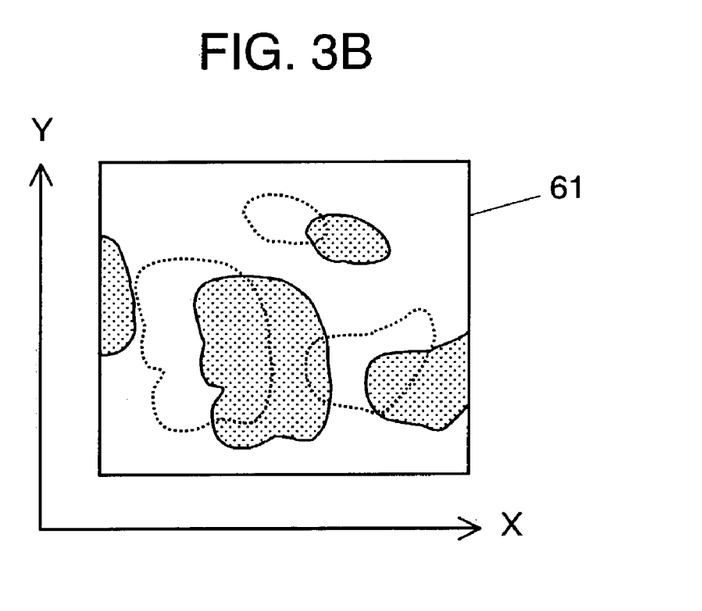

Next, how the rotating direction and speed are determined is described with reference to FIGS. 3A and 3B. FIG. 3A is a schematic diagram illustrating the state of the detecting area at the $n^{th}$ detection by detector 26, and FIG. 3B is a schematic diagram illustrating the state of the detecting area at the $n+1^{th}$ detection by detector 26 after ball 21 rotates for a predetermined angle after the state shown in FIG. 3A. In both FIGS. 3A and 3B, an area detected as a dark portion in detecting area 61 is cross-hatched. In FIG. 3B, the state of the $n+1^{th}$ detection is indicated with a solid line, and the state of the $n^{th}$ detection is indicated by a dotted line.

First, when detecting area 61 is in the state shown in FIG. 3A in the $n^{th}$ detection, detector 26 divides this detecting area 61 into a predetermined number in the X and Y directions respectively. The light intensity detected as pixels in each divided area is then converted to signals and sent to controller 31 as the $n^{th}$ signal. This signal is stored in controller 31. If the state within detecting area 61 changes to the state shown in FIG. 3B due to the operation of ball 21 after a predetermined detecting time of detector 26 from the $n^{th}$ detection, detector 26 executes the next $n+1^{th}$ detection and sends a signal to controller 31 in the same way. Controller 31 compares the $n+1^{th}$ signal received and the $n^{th}$ signal stored, and identifies the operating direction and amount based on the difference between the signals. Then, controller 31 outputs an operation signal for a corresponding function based on the identified operating direction and amount to activate the corresponding function. The above detection and identification allow easy identification of the movement of ball 21 in all directions. Accordingly, the corresponding function is activated with better ability to track the operation.

On the other hand, controller 31 outputs a signal to activate vibration generator 28 every time the identified operation distance matches a predetermined distance so as to vibrate vibration generator 28 momentarily. Then, the entire support member 27 held by housing 30 via resilient member 29 vibrates due to vibration from vibration generator 28, and transmits the vibration to ball 21. In other words, the user experiences tactile feedback in the form of "clicking" during operation when the vibration from vibration generator 28 is transmitted to the user through ball 21.

Next, when the user stops rotating ball 21, ball 21 returns to the original non-operational state, and detector 26 periodically outputs the same signal again. Controller 31 determines that ball 21 is not moved by comparing the signals received at predetermined intervals, and stops the activated corresponding function. At the same time, controller 31 controls light emitter 25 to reduce the light to the original dim level.

As described above, the optical trackball device in the first exemplary embodiment allows the user to recognize operation through two means: light and vibration. Moreover, the light for detecting the movement of ball 21 is utilized for lighting ball 21 itself. This offers an easily identifiable trackball device without requiring an additional component. Furthermore, the first exemplary embodiment reduces power consumption by reducing the light level during non-operational periods.

SECOND EMBODIMENT

Figure 4:
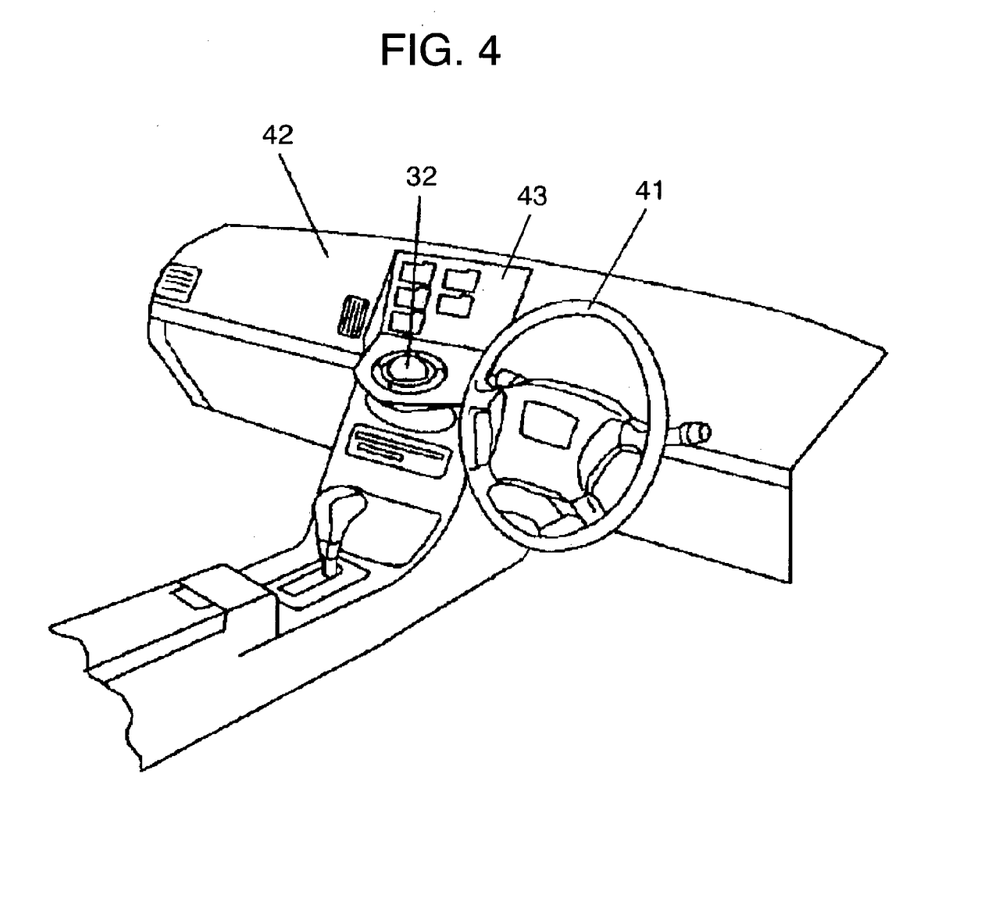
FIG. 4 illustrates application of an optical trackball device to a car navigation system.

FIG. 4 shows the optical trackball device in the first exemplary embodiment of the present invention and an electronic apparatus employing this device. In a second exemplary embodiment, the operation of a car navigation system using the optical trackball device installed in a vehicle is described as an example.

Optical trackball device 32 described in the first exemplary embodiment, steering wheel 41 of the vehicle, dashboard 42, and display 43 of the car navigation system are shown in FIG. 4. Optical trackball device 32 is installed near steering wheel 41 as an example in FIG. 4. However, optical trackball device 32 can also be installed on a rear face of dashboard 42, making ball 21 protrude from dashboard 42. The structure and operation of optical trackball device 32 are the same as those in the first exemplary embodiment, and thus their description is omitted.

Controller 31 in FIG. 2 controls the car navigation system in addition to optical trackball device 32. The results are displayed on display 43.

When optical trackball device 32 is installed inside the vehicle, glass with good oil and chemical resistance is preferably used for ball 21. More specifically, small quantities of oil tend to remain on the fingers after car maintenance. If ball 21 is made of glass, damage to ball 21 due to surface contamination with oil can be reduced even if ball 21 is operated by mistake with oily fingers.

Since glass has high light transmittance, the surface of ball 21 is preferably roughened to a predetermined level so that the reflected light can be detected more easily. This facilitates detection of the rotation of ball 21 using detector 26 constituted by a relatively inexpensive C-MOS image sensor.

This exemplary embodiment refers to the operation of the car navigation system with the optical trackball device installed in the vehicle as an example. In the same way, the present invention is applicable to a wide range of apparatuses, including information terminals and communications terminals such as personal computers, AV equipment and audio equipment, and electric home appliances. The number of components can be reduced and each apparatus can be downsized by integrating the control of the optical trackball device with that of the equipment.

What is claimed is:

1. A trackball device comprising:
   a housing;
   a support member provided in said housing, said support member including a printed circuit board having first and second opposite surfaces;
   an operating member comprising a ball, said ball being rotatably supported by said support member;
   a light emitter arranged to selectively emit light to said ball at a high light level and emit light to said ball at a low light level lower than said high light level, said ball being configured so that said ball is illuminated by partial transmission by said ball of the light emitted by said light emitter, said ball further being configured so as to partially reflect the light emitted by said light emitter;
   a detector arranged to detect light reflected by said ball and to generate signals based on a state of the light reflected by said ball;
   a vibration generator arranged to generate vibration of said ball;
   a controller for monitoring signals from said detector at a predetermined interval and for controlling said light emitter and said vibration generator;
   wherein said controller is operable to cause said light emitter to emit light at said high light level when a signal and a next subsequent signal from said detector are different thereby signifying an operational state of said ball;
   wherein said controller is operable to cause said light emitter to emit light at said low light level when a signal and a next subsequent signal from said detector remain the same for a predetermined period of time;
   wherein said controller is operable to cause said vibration generator to generate vibration of said ball based on the signals from said detector signifying a predetermined operating state of said ball; and
   wherein first resilient members are disposed between said housing and said first surface of said printed circuit board, and second resilient members are disposed between said housing and said second surface of said printed circuit board, such that said support member and said ball are oscillatably supported in said housing such that a clicking tactile feedback is generated via the vibration of said ball generated by said vibration generator.

2. The trackball device as defined in claim 1, said vibration generator is supported by said support member.

3. The trackball device as defined in claim 2, wherein said ball is supported on said circuit board.

4. The trackball device as defined in claim 1, wherein said ball is made of one of glass and resin.

5. The trackball device as defined in claim 1, wherein an entire surface of said ball has a surface roughness of between 3 μm and 20 μm.

6. The trackball device as defined in claim 1, wherein said detector is a two-dimensional device which can detect within a predetermined area.

7. An electronic apparatus comprising a trackball device, and a display for displaying an operational state of said trackball device, wherein said trackball device comprises:
   a housing;
   a support member provided in said housing, said support member including a printed circuit board having first and second opposite surfaces;
   an operating member comprising a ball, said ball being rotatably supported by said support member;
   a light emitter arranged to selectively emit light to said ball at a high light level and emit light to said ball at a low light level lower than said high light level, said ball being configured so that said ball is illuminated by partial transmission by said ball of the light emitted by said light emitter, said ball further being configured so as to partially reflect the light emitted by said light emitter;
   a detector arranged to detect light reflected by said ball and to generate signals based on a state of the light reflected by said ball;
   a vibration generator arranged to generate vibration of said ball;
   a controller for monitoring signals from said detector at a predetermined interval and for controlling said light emitter and said vibration generator;
   wherein said controller is operable to cause said light emitter to emit light at said high light level when a signal and a next subsequent signal from said detector are different thereby signifying an operational state of said ball;
   wherein said controller is operable to cause said light emitter to emit light at said low light level when a signal and a next subsequent signal from said detector remain the same for a predetermined period of time;
   wherein said controller is operable to cause said vibration generator to generate vibration of said ball based on the signals from said detector signifying a predetermined operating state of said ball; and wherein first resilient members are disposed between said housing and said first surface of said printed circuit board, and second resilient members are disposed between said housing and said second surface of said printed circuit board, such that said support member and said ball are oscillatably supported in said housing such that a clicking tactile feedback is generated via the vibration of said ball generated by said vibration generator.

8. The electronic apparatus as defined in claim 7, wherein said controller of said trackball device is also operable to control functions of said electronic apparatus other than functions of said light emitter and said vibration generator.

9. The electronic apparatus as defined in claim 7, said vibration generator is supported by said support member.

10. The electronic apparatus as defined in claim 9, wherein said ball is supported on said circuit board.

11. The electronic apparatus as defined in claim 7, wherein said ball is made of one of glass and resin.

12. The electronic apparatus as defined in claim 7, wherein an entire surface of said ball has a surface roughness of between 3 μm and 20 μm.

13. The electronic apparatus as defined in claim 7, wherein said detector is a two-dimensional device which can detect within a predetermined area.

* * * * *

UNITED STATES PATENT AND TRADEMARK OFFICE
CERTIFICATE OF CORRECTION

| | | |
|---|---|---|
| PATENT NO. | : 7,098,895 B2 | |
| APPLICATION NO. | : 10/464746 | |
| DATED | : August 29, 2006 | |
| INVENTOR(S) | : Takatoshi Ono et al. | |

It is certified that error appears in the above-identified patent and that said Letters Patent is hereby corrected as shown below:

In column 6, line 18, replace "claim 1, said" with --claim 1, wherein said--.

In column 8, line 1, replace "claim 7, said" with --claim 7, wherein said--.

Signed and Sealed this

Ninth Day of January, 2007

JON W. DUDAS
*Director of the United States Patent and Trademark Office*